US012210819B2

(12) United States Patent
Walsh et al.

(10) Patent No.: US 12,210,819 B2
(45) Date of Patent: Jan. 28, 2025

(54) DYNAMIC IMPLEMENTATION OF DOCUMENT MANAGEMENT SYSTEM CAPABILITIES IN THIRD PARTY INTEGRATIONS

(71) Applicant: DocuSign, Inc., San Francisco, CA (US)

(72) Inventors: Blake Thomas Walsh, Seattle, WA (US); Jeffrey Brennan, Seattle, WA (US)

(73) Assignee: DOCUSIGN, INC., San Francisco, CA (US)

( * ) Notice: Subject to any disclaimer, the term of this patent is extended or adjusted under 35 U.S.C. 154(b) by 0 days.

(21) Appl. No.: 17/900,497

(22) Filed: Aug. 31, 2022

(65) Prior Publication Data

US 2024/0070380 A1   Feb. 29, 2024

(51) Int. Cl.
| | | |
|---|---|---|
| *G06F 40/166* | (2020.01) | |
| *G06F 9/445* | (2018.01) | |
| *G06F 9/54* | (2006.01) | |
| *G06F 16/93* | (2019.01) | |
| *G06F 40/117* | (2020.01) | |

(52) U.S. Cl.
CPC ........ *G06F 40/166* (2020.01); *G06F 9/44526* (2013.01); *G06F 9/541* (2013.01); *G06F 16/93* (2019.01); *G06F 40/117* (2020.01)

(58) Field of Classification Search
CPC ....... G06F 40/166; G06F 16/93; G06F 40/117
See application file for complete search history.

(56) References Cited

U.S. PATENT DOCUMENTS

| | | | | |
|---|---|---|---|---|
| 6,721,921 B1 * | 4/2004 | Altman | .................... | G06F 16/38 707/E17.058 |
| 7,039,807 B2 * | 5/2006 | Spitz | ..................... | H04L 9/3247 713/176 |
| 7,171,614 B2 * | 1/2007 | Allor | ..................... | G06F 16/958 707/E17.116 |
| 7,447,738 B1 * | 11/2008 | Andrews | ............. | G06F 16/9574 715/251 |
| 8,103,867 B2 * | 1/2012 | Spitz | ..................... | H04L 9/3247 713/168 |
| 8,484,723 B2 * | 7/2013 | Oswalt | .................. | H04L 9/0861 380/279 |
| 8,533,684 B2 * | 9/2013 | Brunet | ................ | G06F 11/3624 714/37 |

(Continued)

FOREIGN PATENT DOCUMENTS

| | | | | | |
|---|---|---|---|---|---|
| CA | 2400552 | C | * | 1/2011 | ............. G06Q 10/10 |
| CN | 104866512 | A | * | 8/2015 | ............. G06F 16/93 |

(Continued)

*Primary Examiner* — Benjamin Smith
(74) *Attorney, Agent, or Firm* — Shumaker & Sieffert, P.A.

(57) ABSTRACT

A document management system identifies policies specific to an entity's domain and applies relevant policies to documents managed by the entity. The document management system identifies a portion of the document with a triggering property associated with the entity's domain and tags that portion with an application programming interface (API) plug-in. After the document is transmitted to a recipient, the document management system activates the API plug-in. The API plug-in runs a function on the document, applying a subset of the entity's policies to the document.

17 Claims, 4 Drawing Sheets

(56) References Cited

U.S. PATENT DOCUMENTS

| | | | | |
|---|---|---|---|---|
| 8,819,813 B2* | 8/2014 | Oswalt | H04L 9/083 | 726/20 |
| 8,838,980 B2* | 9/2014 | Gonser | H04L 63/126 | 713/176 |
| 8,949,708 B2* | 2/2015 | Peterson | G06F 21/645 | 715/234 |
| 9,003,395 B2* | 4/2015 | Gaither | G06F 8/60 | 717/174 |
| 9,064,238 B2* | 6/2015 | Donoho | G06Q 40/08 | |
| 9,230,130 B2* | 1/2016 | Peterson | G06Q 10/10 | |
| 9,286,281 B2* | 3/2016 | Dunn | G06F 40/143 | |
| 9,292,876 B1* | 3/2016 | Shimkus | G06F 40/134 | |
| 9,300,611 B2* | 3/2016 | Mody | H04L 51/08 | |
| 9,436,668 B2* | 9/2016 | Dunn | G06F 40/171 | |
| 9,563,926 B2* | 2/2017 | Avni | G06F 21/32 | |
| 9,634,975 B2 | 4/2017 | McCabe et al. | | |
| 9,741,085 B2* | 8/2017 | Avni | G06T 1/0028 | |
| 9,818,138 B2* | 11/2017 | Shimkus | G06Q 30/0613 | |
| 9,852,376 B2* | 12/2017 | Donoho | G06Q 50/18 | |
| 9,893,895 B2* | 2/2018 | Peterson | G06F 21/6272 | |
| 9,967,103 B2* | 5/2018 | Kumar | G06Q 10/103 | |
| 10,033,533 B2* | 7/2018 | Gonser | H04L 9/3247 | |
| 10,430,514 B2* | 10/2019 | Guo | G06F 16/958 | |
| 10,430,570 B2 | 10/2019 | Gonser et al. | | |
| 10,469,421 B2* | 11/2019 | Mody | H04L 51/10 | |
| 10,511,732 B2* | 12/2019 | Gonser | G06F 21/64 | |
| 10,614,264 B2* | 4/2020 | Shimkus | G06F 40/117 | |
| 10,628,596 B2* | 4/2020 | Kumar | G06F 21/6209 | |
| 10,878,183 B2* | 12/2020 | Shimkus | H04L 9/3247 | |
| 10,929,597 B2* | 2/2021 | Dang | G06F 40/174 | |
| 10,999,079 B2* | 5/2021 | Schmidt | H04L 9/3228 | |
| 11,050,696 B2* | 6/2021 | Mody | H04L 51/10 | |
| 11,132,105 B2* | 9/2021 | Hickey | G06F 3/04883 | |
| 11,206,139 B2* | 12/2021 | Das | H04L 9/3213 | |
| 11,310,056 B2* | 4/2022 | Schmidt | H04L 9/3228 | |
| RE49,119 E * | 6/2022 | Peterson | H04L 9/3247 | |
| 11,461,539 B2* | 10/2022 | Bhandarkar | G06F 18/40 | |
| 11,615,234 B2* | 3/2023 | Grosse | G06F 40/174 | 704/9 |
| 11,675,638 B1* | 6/2023 | Gras | H04L 67/02 | 719/318 |
| 11,682,072 B2* | 6/2023 | Kim | H04L 9/3247 | 705/300 |
| 11,704,105 B2* | 7/2023 | Liu | G06F 9/5077 | 718/1 |
| 11,704,168 B2* | 7/2023 | Godwin | G06F 9/547 | 719/328 |
| 11,836,817 B2* | 12/2023 | Hunn | H04L 63/12 | |
| 2002/0099938 A1* | 7/2002 | Spitz | H04L 9/3247 | 713/155 |
| 2003/0226102 A1* | 12/2003 | Allor | G06F 16/958 | 707/E17.116 |
| 2004/0139327 A1* | 7/2004 | Brown | G06F 21/34 | 713/176 |
| 2004/0163042 A1* | 8/2004 | Altman | G06F 16/38 | 707/E17.058 |
| 2006/0190734 A1* | 8/2006 | Spitz | H04L 9/3247 | 713/176 |
| 2010/0313032 A1* | 12/2010 | Oswalt | H04L 9/083 | 713/176 |
| 2011/0093769 A1* | 4/2011 | Dunn | G06F 40/174 | 715/221 |
| 2011/0093777 A1* | 4/2011 | Dunn | G06F 40/174 | 715/268 |
| 2011/0093807 A1* | 4/2011 | Dunn | G06Q 10/10 | 715/780 |
| 2012/0110384 A1* | 5/2012 | Brunet | G06F 40/143 | 714/37 |
| 2012/0226646 A1* | 9/2012 | Donoho | G06Q 50/18 | 706/46 |
| 2012/0284591 A1* | 11/2012 | Seed | G06Q 20/3825 | 715/201 |
| 2012/0284602 A1* | 11/2012 | Seed | G06F 16/93 | 715/224 |
| 2013/0050512 A1* | 2/2013 | Gonser | H04N 1/2191 | 348/207.1 |
| 2013/0159720 A1* | 6/2013 | Gonser | G06F 21/32 | 713/176 |
| 2013/0160102 A1* | 6/2013 | Decara | H04L 63/083 | 726/7 |
| 2013/0263283 A1* | 10/2013 | Peterson | H04L 9/3247 | 726/28 |
| 2013/0297935 A1* | 11/2013 | Oswalt | H04L 9/083 | 713/156 |
| 2013/0344469 A1* | 12/2013 | Abrahamson | G09B 5/00 | 434/350 |
| 2014/0046739 A1* | 2/2014 | Gaither | G06Q 30/02 | 705/14.4 |
| 2014/0047429 A1* | 2/2014 | Gaither | G06F 9/44526 | 717/172 |
| 2014/0115713 A1* | 4/2014 | Picazo | G06F 21/64 | 726/26 |
| 2014/0281945 A1* | 9/2014 | Avni | G06V 40/376 | 715/268 |
| 2014/0281946 A1* | 9/2014 | Avni | H04L 63/12 | 726/4 |
| 2014/0297759 A1* | 10/2014 | Mody | H04L 51/08 | 709/206 |
| 2014/0304518 A1* | 10/2014 | Gonser | G06Q 10/10 | 713/176 |
| 2015/0046341 A1* | 2/2015 | Cheng | G06Q 30/0281 | 705/304 |
| 2015/0143218 A1* | 5/2015 | Peterson | G06F 40/186 | 715/223 |
| 2015/0286942 A1* | 10/2015 | Donoho | G06Q 40/02 | 706/46 |
| 2015/0310338 A1* | 10/2015 | Donoho | G06Q 40/02 | 706/51 |
| 2016/0171626 A1* | 6/2016 | Shimkus | G06Q 10/10 | 705/26.35 |
| 2016/0191435 A1* | 6/2016 | Mody | H04L 51/08 | 709/206 |
| 2016/0224523 A1* | 8/2016 | Shimkus | G06Q 40/12 | |
| 2016/0283461 A1* | 9/2016 | Guo | G06F 16/958 | |
| 2016/0321214 A1* | 11/2016 | Hickey | G06F 40/169 | |
| 2017/0180133 A1* | 6/2017 | Kumar | H04L 9/3297 | |
| 2017/0200244 A1* | 7/2017 | Aggarwal | H04L 51/52 | |
| 2017/0287090 A1* | 10/2017 | Hunn | H04L 63/12 | |
| 2017/0344245 A1* | 11/2017 | Kumar | G06F 21/645 | |
| 2018/0267946 A1* | 9/2018 | Dang | G06F 40/174 | |
| 2018/0270070 A1* | 9/2018 | Altman | H04L 9/3247 | |
| 2019/0050587 A1* | 2/2019 | Dang | G06F 21/6209 | |
| 2020/0014645 A1* | 1/2020 | Mody | H04L 51/08 | |
| 2020/0169415 A1* | 5/2020 | Schmidt | H04W 12/068 | |
| 2020/0192653 A1* | 6/2020 | Wang | G06Q 10/103 | |
| 2020/0193088 A1* | 6/2020 | Shimkus | G06Q 10/10 | |
| 2020/0220733 A1* | 7/2020 | Schmidt | H04L 9/3228 | |
| 2020/0287721 A1* | 9/2020 | Das | H04L 9/083 | |
| 2021/0263721 A1* | 8/2021 | Liu | G06F 8/65 | |
| 2021/0397784 A1* | 12/2021 | Grosse | H04L 51/56 | |
| 2022/0035990 A1* | 2/2022 | Kaza | G06F 18/214 | |
| 2022/0035993 A1* | 2/2022 | Bhandarkar | G06F 40/284 | |
| 2022/0109580 A1* | 4/2022 | Das | H04L 9/3213 | |
| 2022/0148078 A1* | 5/2022 | Kim | G06Q 40/02 | |
| 2022/0334892 A1* | 10/2022 | Godwin | G06F 9/547 | |
| 2023/0237349 A1* | 7/2023 | Donoho | G06Q 50/26 | 706/46 |
| 2023/0247075 A1* | 8/2023 | Ramoutar | H04L 65/403 | 348/14.08 |
| 2023/0318846 A1* | 10/2023 | Singh | H04L 9/3247 | 713/176 |

FOREIGN PATENT DOCUMENTS

| | | | | |
|---|---|---|---|---|
| CN | 115589360 A | * | 1/2023 | |
| WO | WO-2022232403 A1 | * | 11/2022 | G06Q 10/103 |

* cited by examiner

300

Document Actions based on ABC Corporation's domain specific policies

- SMS based authentication of Steve Fisher
- SMS based authentication of Jane Smith
- Standard Signature for Steve Fisher
- Standard Signature for Jane Smith Employment Agreement
between ABC Corporation and Jane Smith

Compensation.

ABC Corporation agrees to pay Jane Smith a yearly salary of $90,000, paid in biweekly installments.

Governing Law.

This agreement shall be governed by and construed according to the laws of the State of California.

The undersigned parties have agreed to the terms of this agreement as of its effective date.

/ Steve Fisher signs here /

Steve Fisher
Manager, ABC Corporation

/ Jane Smith signs here /

Jane Smith

Document 160

API Plug Ins 320

Triggering Text 315

Triggering Text 315

FIG. 3

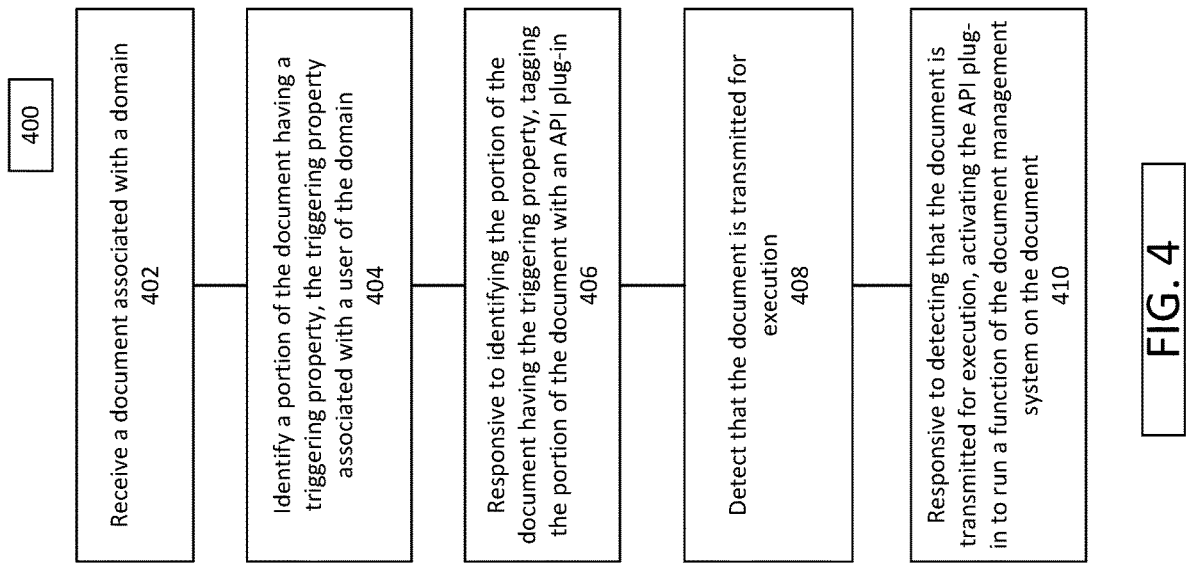

DYNAMIC IMPLEMENTATION OF DOCUMENT MANAGEMENT SYSTEM CAPABILITIES IN THIRD PARTY INTEGRATIONS

TECHNICAL FIELD

The disclosure generally relates to the field of document management, and specifically to dynamically implementing capabilities of a document management system in third party integrations.

BACKGROUND

Online document management systems can be used to create and review documents, providing users with tools to edit, view, and execute the documents. A user may manually apply settings to the document before sending the document to a recipient. In conventional document management systems, this process can be time and labor intensive, especially when handling a number of documents. There is a need to improve document handling and administrative processes in document management systems.

SUMMARY

The document management system receives a document associated with a domain and identifies a portion of the document with a triggering property. The triggering property is associated with a user of the domain. The document management system, in response to identifying the portion of the document with the triggering property, tags the portion of the document for use with an application programming interface (API) plug-in. The document management system detects that the document is transmitted for execution and in response, activates the API plug-in to run a function on the document.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 3 illustrates an example interface of the document management system that displays a document with tagged API plug-ins, in accordance with an example embodiment.

FIG. 4 illustrates an exemplary process for integrating API plug-ins with a document associated with a domain, in accordance with an example embodiment.

DETAILED DESCRIPTION

Figure 1:
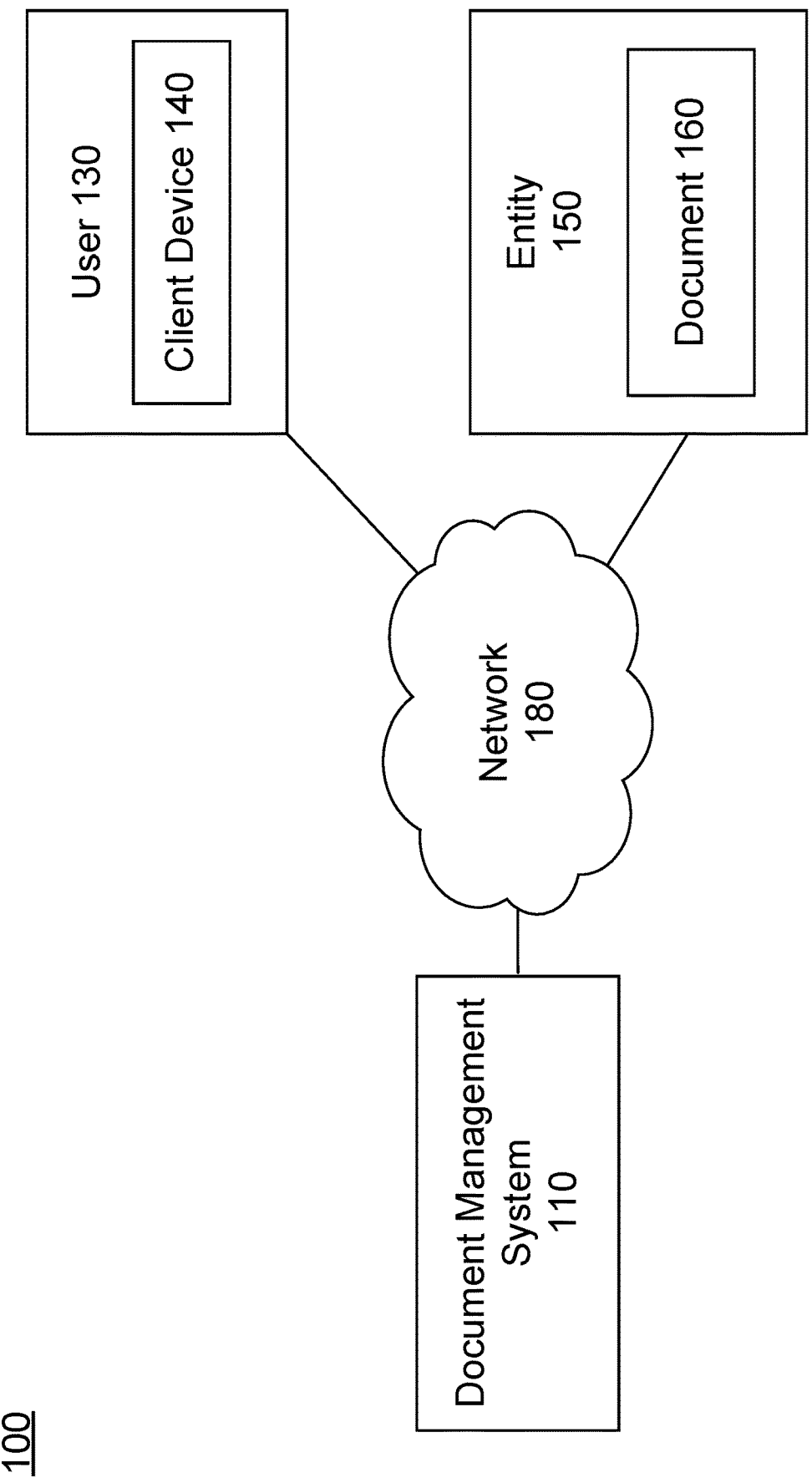
FIG. 1 is a high-level block diagram of a system environment for a document management system, in accordance with an example embodiment.

The FIGS. and the following description relate to preferred embodiments by way of illustration only. It should be noted that from the following discussion, alternative embodiments of the structures and methods disclosed herein will be readily recognized as viable alternatives that may be employed without departing from the principles of what is claimed. Reference will now be made in detail to several embodiments, examples of which are illustrated in the accompanying figures. It is noted that wherever practicable similar or like reference numbers may be used in the figures and may indicate similar or like functionality. A letter after a reference numeral, such as "120A," indicates that the text refers specifically to the element having that particular reference numeral. A reference numeral in the text without a following letter, such as "120," refers to any or all of the elements in the figures bearing that reference numeral.

The figures depict embodiments of the disclosed system (or method) for purposes of illustration only. One skilled in the art will readily recognize from the following description that alternative embodiments of the structures and methods illustrated herein may be employed without departing from the principles described herein.

Document Management System Overview

A document management system enables a party (e.g., individuals, organizations, etc.) to create and send documents to one or more receiving parties for negotiation, collaborative editing, electronic execution (e.g., via electronic signatures), contract fulfillment, archival, analysis, and more. For example, the document management system allows users of the party to create, edit, review, and negotiate document content with other users and other parties of the document management system. An example document management system is further described in U.S. Pat. No. 9,634, 975, issued Apr. 25, 2017, and U.S. Pat. No. 10,430,570, issued Oct. 1, 2019, which are hereby incorporated by reference in their entireties.

The system environment described herein can be implemented within the document management system, a document execution system, or any type of digital transaction management platform. It should be noted that although description may be limited in certain contexts to a particular environment, this is for the purposes of simplicity only, and in practice the principles described herein can apply more broadly to the context of any digital transaction management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

A user of the document management system may be associated with an entity (e.g., as an employee or administrator). The entity may require the user to apply certain policies relating to document retention, user authentication, and document security to the entity's documents. In some instances, entities implement such document policies to comply with legal requirements. For example, before presenting a recipient with a will for execution, a jurisdiction may require authentication of the recipient.

An entity may use third party applications for various tasks, such as employee onboarding and training. With conventional document management methods, the entity is often unable to set document policies within these third party applications because it lacks access to the third party's administrative settings. Even when the entity requests or adds document policies to the third party application, the policies are often static and become outdated as new laws and entity policies are implemented. Manually updating document policies whenever a change is required can become time and labor intensive, resulting in higher costs for the entity.

The methods described herein improve administrative processes within the document management system so that the document management system automatically implements an entity's policies to a document. The document management system receives the document associated with the domain of the entity and identifies a portion of the document that has a triggering property. For example, the document may have specific text, an alphanumeric phrase, a set of characters, or associated metadata that may be designated, by a user of the domain and/or a machine learned model of the document management system, to trigger one or more policy related functions.

The document management system tags the identified portion of the document with an application programming interface (API) plug-in. An API plug is a software component that runs a function on the document. Examples of functions include, but are not limited to, transmitting the document, revising the document, and relevant to the methods described herein, applying policies to the document. The tagged API plug-in corresponds to the triggering property, such that when activated, the API plug-in runs the corresponding policy related functions. When the document is transmitted for execution to a recipient, the document management system activates the API plug-in. The activated API plug-in runs the policy related functions, thereby applying the user designated policies to the document. Where the API plug-in is mentioned as being part of the document, this includes scenarios where a reference to the API plug-in is part of the document.

FIG. 1 is a high-level block diagram of a system environment 100 for a document management system 110, in accordance with an example embodiment. The system environment 100 enables user 130 to generate documents more efficiently with the document management system 110. As illustrated in FIG. 1, the system environment 100 includes a document management system 110, user 130 and corresponding client device 140, an entity 150, and a document 160, each communicatively interconnected via a network 180. In some embodiments, the system environment 100 includes components other than those described herein. For clarity, although FIG. 1 depicts only one user 130, client device 140, entity 150, and document 160, alternative embodiments of the system environment 100 can have any number of users and client devices. For the purposes of concision, the web servers, data centers, and other components associated with an online system environment are not shown in FIG. 1.

The document management system 110 is a computer system (or group of computer systems) for storing and managing documents for the user 130 and the entity 150. Using the document management system 110, the user 130 can collaborate to create, edit, review, store, analyze, manage, and negotiate documents, such as the document 160, on behalf of the entity 150. The document 160, as well as other documents in the document management system 110, may be employment agreements, purchase agreements, service agreements, financial agreements, master services agreements, intellectual property licensing agreements, rental agreements, mortgage agreements, and so on.

The document management system 110 can be a server, server group or cluster (including remote servers), or another suitable computing device or system of devices. In some implementations, the document management system 110 can communicate with the client device 140 over the network 180 to receive instructions and send documents (or other information) for viewing on the client device 140A. The document management system 110 can assign varying permissions to individual users (e.g., the user 130) or groups of users controlling which documents each user can interact with and what level of control the user has over the documents they have access to. The document management system 110 will be discussed in further detail with respect to FIG. 2.

The user 130 of the client device 140 can perform actions relating to documents stored within the document management system 110. Each client device 140 is a computing device capable of transmitting and/or receiving data over the network 180. Each client device 140 may be, for example, a smartphone with an operating system such as ANDROID® or APPLE® IOS®, a tablet computer, laptop computer, desktop computer, or any other type of network-enabled device from which secure documents may be accessed or otherwise interacted with. In some embodiments, the client device 140 include an application through which the user 130 can access the document management system 110. The application may be a stand-alone application downloaded by the client device 140 from the document management system 110. Alternatively, the application may be accessed by way of a browser installed on the client device 140 and instantiated from the document management system 110. The client device 140 enables the user 130 to communicate with the document management system 110. For example, the client device 140 enables the user 130 to upload, access, review, execute, and/or analyze documents within the document management system 110 via a user interface. In some implementations, the user 130 can also include AIs, bots, scripts, or other automated processes set up to interact with the document management system 110 in some way. According to some embodiments, the user 130 is associated with permission definitions defining actions that the user 130 can take within the document management system 110, or on documents, templates, permissions associated with other users and/or workflows.

The entity 150 is organization that uses the document management system 110. The user 130 may be associated with the entity 150 as an employee or an administrator. In the example herein, the entity 150 manages the document 160. The entity 150 and/or the user 130 (e.g., acting on behalf of the entity 150) may be a party to the document 160.

The entity 150 may use a third party application for certain tasks (e.g., employee onboarding and training, payroll, project management, accounting and budgeting, and so on). The entity 150 may occupy its own domain within the document management system 110 to store and manage documents, but when handling documents through the third party application, may not have full access to all features, capabilities, and settings of the document management system 110. Thus, the entity 150 is limited to the settings of the third party application and often needs to manually update policies for documents within the third party application. In some instances, the third party application may not be equipped to apply any policies to documents at all. For example, the entity 150 may use a third party human resources management system for its employee onboarding processes. When applying policies to related employee onboarding documents, the entity 150 may be limited to the third party system's features; the third party system may not have the appropriate document security or user authentication features that the entity 150 requires, for example.

The network 180 transmits data within the system environment 100. The network 180 may be a local area or wide area network using wireless or wired communication systems, such as the Internet. In some embodiments, the network 180 transmits data over a single connection (e.g., a data component of a cellular signal, or Wi-Fi, among others), or over multiple connections. The network 180 may include encryption capabilities to ensure the security of customer data. For example, encryption technologies may include secure sockets layers (SSL), transport layer security (TLS), virtual private networks (VPNs), and Internet Protocol security (IPsec), among others.

Figure 2:
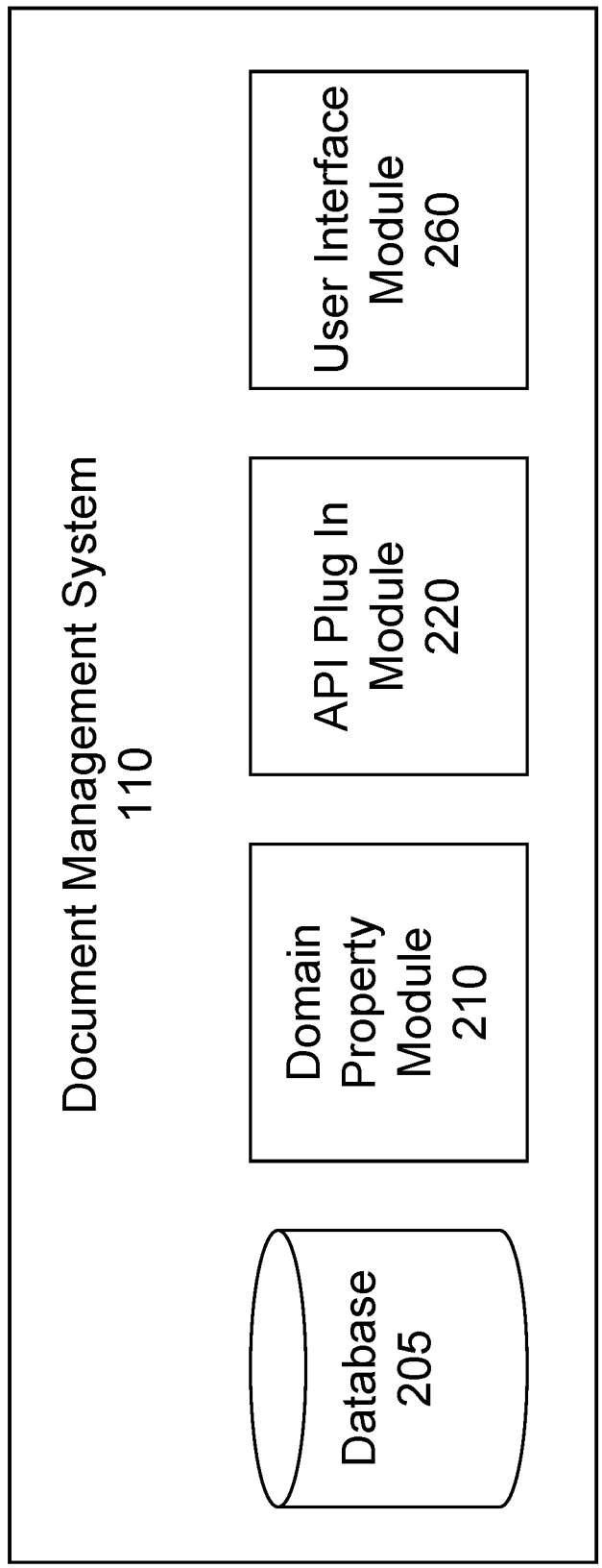
FIG. 2 is a high-level block diagram of a system architecture of the document management system, in accordance with an example embodiment.

FIG. 2 is a high-level block diagram of a system architecture of the document management system 110, in accordance with an example embodiment. The document management system 110 includes a database 205, a domain property module 210, an application programming interface (API) plug-in module 220, and a user interface module 260. Computer components such as web servers, network interfaces, security functions, load balancers, failover servers, management and network operations consoles, and the like may not be shown so as to not obscure the details of the system architecture. The document management system 110 may contain more, fewer, or different components than those shown in FIG. 2 and the functionality of the components as described herein may be distributed differently from the description herein.

The database 205 stores information relevant to the document management system 110. The database 205 can be implemented on a computing system local to the document management system 110, remote or cloud-based, or using any other suitable hardware or software implementation. The data stored by the database 205 may include, but is not limited to, the document 160, text (including clauses, terms, and legal obligations, for example) of the document 160, metadata associated with the document 160, document policies designated by the user 130 and/or the entity 150, policies associated with the document 160, information about users (e.g., the user 130), client device identifiers (e.g., of the client device 140), machine-learned models, and other information stored by the document management system 110. The document management system 110 can update information stored in the database 205 as new information is received, such as new documents and associated policies.

The domain property module 210 identifies policies to apply to the document 160. Within the document management system 110, the entity 150 occupies its own network domain. Users (e.g., including the user 130) associated with the entity 150 often share access to resources and documents within the entity 150's domain. The domain property module 210, by identifying a domain of the document 160, determines that the document 160 is associated with the entity 150. Accordingly, the domain property module 210 determines policies specific to the entity 150's domain ("domain specific policies"), and which of those policies to apply to the document 160. The domain property module 210 may identify domain specific policies when the document 160 is created, when the document 160 is transmitted for execution, when a recipient opens the document 160, and/or in response to a request by a user of the document management system 110.

As per instructions from the entity 150, the domain property module 210 sets domain specific policies to apply to documents (e.g., the document 160) that it creates, receives, or otherwise manages. In some embodiments, in addition to or instead of the entity 150 providing instructions on its own domain specific policies, the document management system 110 automatically sets the domain specific policies. In other embodiments, specific users or administrators associated with the entity 150 may set the domain specific policies.

The domain specific policies may relate to document retention, user authentication, document security, payment, and conditional routing orders, among others. By applying document retention policies, the entity 150 can limit user access to a document. For example, document retention policies may include limiting user access to the document after a period of time, removing user access to the document after a period of time, deleting the document after a period of time, and/or setting an expiration date for the document after a period of time. User authentication policies verify the identity of a user of a document, such as through password based, multifactor, single sign on, certificate based, knowledge based, SMS based, and/or token based authentication methods. Additionally, user authentication policies may require users to present official identification (e.g., a passport or driver's license). Document security policies protect the contents of a document, such as through encryption, watermarking, document expiry and self-destruction, and/or digital tracking of users who access, view, or edit the document. In some embodiments, the entity 150 sets domain specific payment policies such that through the document management system 110, the entity 150 pays a recipient of a document or receives a payment from the recipient of the document. In another embodiment, the entity 150 sets conditional routing orders, designating one or more recipients to send the document 160 to.

In some embodiments, the domain property module 210 combines one or more of the domain specific policies described above based on instructions from the entity 150. The combination of domain specific policies may ensure compliance with a jurisdiction's requirements. For example, for an executed document to be legally enforceable, a country may require that the entity 150 employ a combination of user authentication and document security methods. Accordingly, the entity 150 may set standard signature policies that require that a signee to a document be verified through official identification, multi-factor authentication, and/or digital security certificates. The entity 150 may set other combinations of the domain specific policies described above. In other embodiments, the entity 150 generates domain specific policies other than those described above.

The domain property module 210 may set different policies for different documents within the entity 150's domain. For example, the policies may vary based on a type of document, a jurisdiction in which the document was created and/or will be executed in, parties to the document, legal requirements, sensitive information in the document, a monetary value associated with the document, and/or policies applied to similar documents in the past.

The domain property module 210 identifies at least one portion of the document 160 that has a triggering property ("triggering portion"). A triggering portion of the document 160 triggers the application of a domain specific policy to the document 160. The triggering portion of the document 160 may be a semantic string of text, alphanumeric characteristics, metadata associated with the document 160, or a combination thereof. In some embodiments, the triggering portion is included in the text of the document 160, in the form of a clause, the name of a party to the document 160, and/or both, for example. Examples of metadata that may serve, in part, as the triggering portion include a location of the user, an IP address of the user, a date the document was opened and/or created, and so on. In other embodiments, the triggering portion is not readily visible to users of the document 160 (e.g., a background pixel and/or white text on a white background).

The domain property module 210 may use a machine-learned model to identify domain specific policies to apply to the document 160. Specifically, the machine-learned model may be used to identify the entity 150's domain specific policies, generate domain specific policies, identify triggering portions of the document 160, and/or generate semantic strings that have triggering properties. To train the machine-learned model, the document management system 110 may use past documents associated with the entity 150's domain. In training, the machine-learned model learns the domain specific policies associated with specific types of documents and/or users associated with the entity 150, as well as triggering portions of documents for each domain specific policy. In some embodiments, the machine-learned model is trained to identify high risk clauses, which the domain property module 210 then identifies as a triggering portion for a set of document security policies. The trained machine-learned model is stored in the database 205 and may be updated (e.g., retrained) over time.

The API plug-in module 220 applies and activates API plug-ins with respect to the document 160, thereby applying the domain specific policies to the document 160. An API plug-in is a software component that, when called and/or activated, runs a function of the document management system 110 on the document within which it is referenced. In this example, API plug-ins are configured to run functions corresponding to the domain specific policies on the document 160. In addition to applying domain specific policies to the document 160, API plug-ins may perform other functions within the document management system 110. For example, the API plug-ins could share the document 160 with other users, facilitate execution of the document 160, record metadata about users viewing and/or sharing the document 160, and receive payment related to the document 160, among others.

After the domain property module 210 determines that a triggering portion corresponds to a domain specific policy, the API plug-in module 220 tags the triggering portion of the document as a reference to the appropriate API plug-in. Subsequently, after the document management system 110 sends the document 160 (e.g., for execution, review, approval, etc.) to a recipient, the API plug-in module 220 activates the API plug-in to run a function on the document 160. In effect, the activated API plug-in applies the domain specific policy to the document 160.

For example, if the triggering portion of the document 160 corresponds to a user authentication policy, the API plug-in module 220 tags the triggering portion with an API plug-in reference for user authentication. After the document 160 is transmitted to a recipient, the API plug-in module 220 activates the tagged API plug-in and runs a user authentication function on the document 160. The user authentication function may initiate a set of steps for the user to verify their identity; the set of steps may be specified by the entity 150, or in some embodiments, generated by the document management system 110.

In an embodiment, the domain property module 210 and API plug-in module 220 may dynamically respond to updates to the entity 150's domain specific policies. In such an embodiment, when the entity 150 changes a document retention policy for a type of document, for example, the domain property module 210 automatically identifies a new portion of the document 160 that triggers the document retention policy. The API plug-in module 220 tags the new triggering portion with the API plug-in corresponding to the document retention policy and activates the API plug-in. The dynamic updating of the API plug-in that corresponds to the document 160 thus mitigates the manual effort needed by the user 130 and/or an administrator of the entity 150 to implement new domain specific policies.

The user interface module 260 generates user interfaces for users (e.g., the user 130) to interact with the document management system 110. Through the generated user interface, users can upload documents (e.g., the document 160), input and/or view domain specific policies, revise triggering portions of documents, and provide feedback regarding the triggering portions of documents. In addition, through the user interface, users can add, delete, or modify the contents of the document 160, as well as other documents stored in the document management system 110. In some embodiments, the generated user interface allows users to modify content such as text, images, links to outside sources of information such as databases, and the like.

Dynamically Integrating API Plug-Ins into a Document

FIG. 3 illustrates an example interface 300 of the document management system 100 that displays a document with tagged API plug-ins, in accordance with an example embodiment. The interface 300 (e.g., generated by the user interface module 260 of the document management system 110) includes text of the document 160, triggering text portions 315, and a set of API plug-ins 320.

As discussed with respect to FIG. 2, the document management system 110 identifies and applies domain specific policies relevant to the document 160. The document management system 110 (e.g., via the domain property module 210) determines domain specific policies for the entity 150 and identifies triggering portions of the document 160 that correspond to at least a subset of those domain specific policies. In the example presented herein, the document management system 110 identifies, within the document 160, two triggering text portions 315. The triggering text portions 315 may correspond to user authentication and standard signature policies of the entity 150.

In some embodiments, the document management system 110 may identify the policies corresponding to the triggering text portions 315 based on additional factors, such as location, time, a type of the entity 150, a type of a user of the document 160, and so on. The triggering text portions 315 may trigger the document management system 110 to use metadata of the document 160 to determine these additional factors. For example, in response to detecting the triggering text "signs here," as depicted in FIG. 3, the document management system 110 may query an IP address of a user (e.g., a sender and/or recipient) of the document 160 and subsequently identify legal requirements for documents in the user's jurisdiction. For example, if recipients of the document 160 have German IP addresses, the document management system 110 will attribute user authentication and standard signature policies compliant with German laws and regulations to the triggering text portions 315.

The document management system 110 (e.g., via the API plug-in module 220) tags the triggering portions of the document 160 with API plug-ins that, when implemented, will apply corresponding policies to the document 160. In this example, the document 160 includes portions of text—the triggering text portions 315—that trigger user authentication and standard signature policies. The document management system 110 tags the triggering text portions 315 with the API plug-ins 320 that correspond to user authentication and standard signatures. As per the example described above, if the recipient of the document 160 is located in Germany, the document management system 110 tags the triggering text portions 315 with an API plug-in that, when called, will implement user authentication and standard signature policies specific to German users and/or documents (e.g., in compliance with German laws).

In some embodiments, the document management system 110 dynamically updates tagged API plug-ins as per changes in the domain specific policies of the entity 150 and/or changes in legal requirements in relevant jurisdictions. In some embodiments, the document management system 110 revises the triggering text portions 315 as per domain specific policy changes (e.g., as instructed by the entity 150). In other embodiments, the document management system 110 may periodically check for updates to a jurisdiction's legal requirements and automatically revise the triggering text portions 315. In other embodiments, the document management system 110 may make and/or detect changes in metadata of the document 160 to trigger updated tagged API plug-ins. Based on changes to the triggering text portions 315 and/or a jurisdiction's legal requirements, the document management system 110 tags the triggering text portions 315 with new and/or updated API plug-ins as necessary.

When the document is sent for execution, for example, or otherwise transmitted to another user, the document management system 110 activates the API plug-ins 320 to run functions on the document 160, applying the user authentication and standard signature policies. As mentioned, the applied document policies may be compliant with the laws of a specific jurisdiction. For example, if German laws and the entity 150's user authentication policy mandate that users must verify their identities through SMS, the document management system 110 will initiate a series of steps that will allow recipients to do so before they execute the document 160. Similarly, if German laws and the entity 150's standard signature policy requires proof of identification of the recipients and a digital security certificate, the document management system 110 will initiate the steps that allow the recipients to verify their identities through official identification and check for a digital security certificate before allowing the recipients to execute the document 160.

FIG. 4 illustrates an exemplary process for integrating API plug-ins with a document associated with a domain, in accordance with an example embodiment. Process 400 may be executed based on one or more processors executing instructions encoded on a computer-readable medium, the one or more processors actuating functionality of modules disclosed herein. Process 400 begins with document management system 110 receiving 402 a document associated with a domain. Document management system 110 then identifies 404 a portion of the document having a triggering property (e.g., using domain property module 210), the triggering property associated with a user of the domain.

Responsive to identifying the portion of the document having the triggering property, document management system 110 tags 406 the portion of the document with an application programming interface (API) plug-in (e.g., using API plug-in module 220). Document management system 110 detects 408 that the document is transmitted for execution, and responsively activates 410 the API plug-in to run a function of the document management system on the document.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, by a document management system, a document associated with a domain;
   identifying, by the document management system, a portion of the document having a triggering property corresponding to a domain specific policy of the domain;
   responsive to identifying the portion of the document having the triggering property, tagging, by the document management system, the portion of the document with a reference to an initial application programming interface (API) plug-in;
   responsive to a change in the triggering property and after tagging the portion of the document with the reference to the initial API plug-in, tagging, by the document management system and based on the domain specific policy of the domain, the portion of the document with a reference to an updated API plug-in;

detecting, by the document management system, that the document is transmitted for electronic execution via one or more electronic signatures; and responsive to detecting, by the document management system, that the document is transmitted for electronic execution via one or more electronic signatures, activating, by the document management system and using the reference to the updated API plug-in, the updated API plug-in, wherein, when activated, the updated API plug-in runs a function implementing the domain specific policy on the document.

2. The method of claim 1, wherein the portion of the document having the triggering property comprises text within the document.

3. The method of claim 1, wherein the portion of the document having the triggering property comprises metadata associated with the document.

4. The method of claim 1, wherein activating the API plug-in comprises:

initiating an authentication process to verify an identity of a recipient of the document; and responsive to verifying the identity of the recipient, providing the recipient with access to the document.

5. The method of claim 4, wherein the authentication process is associated with a user of the domain.

6. The method of claim 1, wherein activating the updated API plug-in comprises limiting access of a user to the document after a period of time, the period of time determined by an administrator of the domain.

7. The method of claim 1, wherein activating the updated API plug-in comprises providing a payment to a recipient of the document.

8. The method of claim 1, wherein a machine-learned model is configured to identify the portion of the document having the triggering property, the machine-learned model trained on a set of documents associated with the domain.

9. The method of claim 1, wherein the domain is a network domain.

10. Non-transitory computer-readable storage media storing executable instructions that, when executed, cause one or more processors to:

receive a document associated with a domain;

identify a portion of the document having a triggering property corresponding to a domain specific policy of the domain;

responsive to identifying the portion of the document having the triggering property, tag the portion of the document with a reference to an initial application programming interface (API) plug-in;

responsive to a change in the triggering property and after tagging the portion of the document with the reference to the initial API plug-in, tag, based on the domain specific policy of the domain, the portion of the document with a reference to an updated API plug-in;

detect that the document is transmitted for electronic execution via one or more electronic signatures; and responsive to the detection that the document is transmitted for electronic execution via one or more electronic signatures, activate, using the reference to the updated API plug-in, the updated API plug-in, wherein, when activated, the updated API plug-in runs a function implementing the domain specific policy on the document.

11. The non-transitory computer readable storage media of claim 10, wherein the portion of the document having the triggering property comprises one or more of:

text within the document; or metadata associated with the document.

12. The non-transitory computer readable storage media of claim 10, wherein the instructions that cause the one or more processors to activate the updated API plug-in further cause the one or more processors to:

initiate an authentication process to verify an identity of a recipient of the document; and responsive to a verification of the identity of the recipient, provide the recipient with access to the document.

13. The non-transitory computer readable storage media of claim 12, wherein the authentication process is associated with a user of the domain.

14. The non-transitory computer readable storage media of claim 10, wherein the instructions to activate the updated API plug-in further cause the one or more processors to limit access of a user to the document after a period of time, the period of time determined by an administrator of the domain.

15. The non-transitory computer readable storage media of claim 10, wherein the instructions to activate the updated API plug-in further cause the one or more processors to provide a payment to a recipient of the document.

16. The non-transitory computer readable storage media of claim 10, wherein a machine-learned model is configured to identify the portion of the document having the triggering property, the machine-learned model trained on a set of documents associated with the domain.

17. A document management system comprising:

one or more hardware processors; and non-transitory computer-readable storage media storing executable instructions that, when executed, cause the one or more hardware processors to:

receive a document associated with a domain;

identify a portion of the document having a triggering property corresponding to a domain specific policy of the domain;

responsive to identifying the portion of the document having the triggering property, tag the portion of the document with a reference to an initial application programming interface (API) plug-in;

responsive to a change in the triggering property and after tagging the portion of the document with the reference to the initial API plug-in, tag, based on the domain specific policy of the domain, the portion of the document with a reference to an updated API plug-in;

detect that the document is transmitted for electronic execution via one or more electronic signatures; and responsive to the detection that the document is transmitted for electronic execution via one or more electronic signatures, activate, using the reference to the updated API plug-in, the updated API plug-in, wherein, when activated, the updated API plug-in runs a function implementing the domain specific policy on the document.

* * * * *